United States Patent Office 3,073,865
Patented Jan. 15, 1963

3,073,865
PROCESS FOR CATALYTICALLY REDUCING HALOGEN-SUBSTITUTED AROMATIC NITRO COMPOUNDS TO THE CORRESPONDING AMINES
Louis Spiegler, Woodbury, N.J., assignor to E. I. du Pont de Nemours and Company, Wilmington, Del., a corporation of Delaware
No Drawing. Filed Sept. 17, 1958, Ser. No. 761,462
9 Claims. (Cl. 260—580)

This invention is directed to a novel process for catalytically reducing halogen substituted aromatic nitro compounds to the corresponding amines. In particular the present invention deals with the process of catalytically reducing, with a platinum catalyst supported on carbon, aromatic nitro compounds which are substituted in the aromatic ring with halogen atoms.

It is recognized in the art that the catalytic reduction of halogen substituted aromatic nitro compounds to the halogen substituted amine is not satisfactory because of extensive dehalogenation during the process; this is exemplified in an article in the Journal of the American Chemical Society (68, p. 261, 1946) wherein Baltzley and Phillips state: "The removal of halogen during catalytic hydrogenations of organic compounds is a familiar phenomenon"; they add further: "despite occasional instances to the contrary, most workers have considered loss of halogen inevitable in catalytic hydrogenations."

In U.S. Patent 2,791,613 it is recognized that hydrogenation processes "are not generally suitable for converting halonitrobenzenes to haloanilines, primarily because considerable dehalogenation accompanies the reduction reaction." The process described in this patent alleviates the problem, insofar as meta-halonitrobenzene is concerned, by using a complex catalyst of copper and chromium; this complex catalyst, however, requires special conditions and is not generally applicable to other than meta-halogenated benzenes.

U.S. Patent 2,772,313 also recognizes that prior art processes "are not entirely suitable for hydrogen reduction of halonitrobenzenes to haloanilines" and teaches the use of a rhodium catalyst to effect reduction with a minimum of dehalogenation; this rhodium catalyst is extremely expensive (about four times the cost of a comparable platinum catalyst); furthermore, the process of U.S. Patent 2,772,313 requires the presence of an organic solvent.

It is an object of the present invention to provide a novel process whereby catalytic hydrogenation of halogen substituted aromatic nitro compounds may be accomplished without attendant dehalogenation occurring in any substantial amount. It is a further object to carry out this reduction with a platinum catalyst in either aqueous or solvent systems as preferred. These and other objects will become apparent in the following description and claims.

More specifically, the present invention is directed to a process of reducing aromatic halogen substituted nitrocompounds to the corresponding amine by catalytic hydrogenation with a catalyst consisting of platinum supported on carbon, the improvement consisting of carrying out the reduction with (a) a weight ratio of nitrocompound to platinum greater than 10,000:1 and (b) having present, in the reaction medium, between 0.1 and 1.0 weight percent of said nitrocompound of an oxide or hydroxide of magnesium.

The process of the present invention is carried out in conventional equipment, either batchwise or continuously and in either aqueous or non-aqueous systems. In general, the process is carried out by charging the reaction vessel with water or solvent and then adding the nitrobody, catalyst, and magnesium oxide. Then hydrogen gas is passed into the system either at atmospheric pressure or at super-atmospheric pressure as the reactants are vigorously agitated. The reaction is carried out usually at temperatures of about 30° to 120° C. and the reaction is judged complete when analysis for nitrobody shows less than 0.2% unreduced material present.

Recovery of the product is carried out by separating solvent or water from the product, filtering to recover the valuable catalyst, and then drying the amine product. Further purification by distillation may be made if an extremely high quality product is desired.

The catalyst used in this novel process is a platinum catalyst supported on carbon; the preparation of such catalysts is well known in the art. In general, catalyst preparation is carried out by any of numerous methods such as (a) impregnating an absorbent support with a platinum metal salt solution by evaporating a solution of the platinum salt in the presence of the support or (b) precipitation of platinum hydroxide in the presence of an inert support by adding a platinum chloride solution to a hot alkaline solution in which the support is suspended. The preferred procedure is to add bicarbonate to a solution of platinum chloride in water containing suspended carbon, then heating to precipitate platinum hydroxide, and filtering off the catalyst, as exemplified by U.S. Patent 2,823,235. After platinum oxide or hydroxide is deposited on the carbon support, this compound must be reduced to metallic platinum, said platinum being the active catalytic metal. This reduction can be carried out either by hydrogenation or by a chemical reducing agent, such as formaldehyde.

The catalyst utilized according to the present invention must consist only of platinum. The presence of other catalytic metals (e.g., palladium) is detrimental to the present novel process as shown by Example 25 and Example 23.

The carbon support used for the platinum catalysts of the present novel process may be either vegetable or animal carbon and may be porous or non-porous material. Preferably, however, highly oleophilic carbons will be used since these oleophilic carbons have the added advantage of giving increased reduction rates as described in U.S. Patent 2,823,235. Such highly oleophilic carbons are known in the trade as Shawinigan Acetylene Black or conductive furnace blacks. As indicated however, other carbon supports may be used and these carbon black supports may be any of the readily available furnace blacks such as Spheron No. 6, Philblack O, Lampblack, or commercial porous carbons of vegetable or animal origin such as Norit, Darco G-60, etc.

These carbon black supports are representative and are more fully described in the following table.

| Carbon Back | Description | Available From— |
| --- | --- | --- |
| Acetylene Black | Non-porous, oleophilic conductive furnace black from acetylene. | Shawinigan Co., Ltd., Canada. |
| Spheron 6 | Channel Black | Godfrey L. Cabot, Inc. |
| Philblack O | Reinforcing Black | Phillips Petroleum Co. |
| Lampblack | Semi-reinforcing black | The L. Martin Co. |
| Darco G-60 | Activated Carbon | Atlas Powder Co. |
| Norit | do | American Norit Co., Inc. |

The concentration of platinum metal on the carbon black support utilized according to the present process will generally be between 0.5% and 5% as a preferred range.

Preferably, the catalyst will contain about 1% by weight as platinum metal and preferably a concentrated catalyst of about 5 to 10% will be prepared and subsequently diluted for use as described in U.S. Patent 2,823,235.

One of the critical features of this novel process is that the ratio of nitrobody to platinum be maintained above 10,000:1. That is, for every part of halogen-containing nitrobody to be reduced there shall be used an amount of platinum less than 0.0001 part of platinum. If too much platinum catalyst is used dehalogenation will occur to an appreciative extent. On the other hand, sufficient catalyst must be used so that the rate of reduction will not be impractically slow under practical conditions. When the above ratio is much greater than 150,000:1 the reaction rate is too slow for practical use.

Another critical feature of this invention is that magnesium oxide (or hydroxide) must be present in the reaction medium and that the amount of magnesium compound must be between 0.1 and 1.0% by weight of the halogenated nitrocompound being reduced. Less than 0.1% MgO or $Mg(OH)_2$ does not achieve sufficient reduced dehalogenation whereas above 1% by weight thereof promotes dehalogenation as hereinafter described.

Related to the effect of magnesium oxide is the choice of liquid medium for the reduction process. In a solvent system such as methanol, more magnesium oxide can be tolerated than in aqueous systems. For example, when using an aqueous system the amount of magnesium oxide should be less than about 0.4% of the nitrobody in order to keep dehalogenation at a minimum. With organic solvent systems, up to 1% MgO can be used to get significant reduction in dehalogenation.

It appears that the magnesium oxide functions to reduce dehalogenation, at least in part, by virtue of its specific ability to interact with the platinum catalyst and modify the catalyst activity. Also involved is the amount of magnesium oxide used which must be within the range indicated above. Too little magnesium oxide results in inadequate inhibition or modification of catalyst and subsequent dehalogenation. In an aqueous system, too much magnesium oxide tends to increase the pH of the reaction mass and promotes dehalogenation. But by keeping within the limits defined, minimum dehalogenation is experienced. Since in aqueous systems, this process results in a pH value of near 7.0, the process has the additional advantage of being essentially noncorrosive on steel equipment.

As indicated, the present novel process applies to the conversion of halogen substituted aromatic nitro compounds to the corresponding halogen substituted aromatic amines without substantial loss of halogen; the process of this invention may be applied to any halogen substituted aromatic nitro compound. For example, the aromatic nitro compound may be a phenyl or naphthyl compound; the halogen substituents for example may be chlorine, fluorine or bromine; the aromatic radical may be substituted with alkyl radicals, hydroxy groups, methoxy groups, carboxylic acid radicals, sulfonic acid radicals, amino groups, etc.; accordingly, the compounds which may be reduced by means of this process are those having the structure:

where A is an aromatic radical such as phenyl, naphthyl, etc. $n$ is a small integer, X is halogen, $m$ is a small integer, Y is hydrogen, an alkyl radical, hydroxy, hydroxyalkyl, methoxy, carboxy, carboxyalkyl, sulfoxy, amino, etc. Thus, in accord with the above structure examples of compounds which may be reduced by means of this process are: 2,6-dichloro-4-nitrophenol and its position isomers, 4-chloro-2-nitroanisole and isomers, 2-chloro-4-nitroaniline, 6-chloro-2-nitrosodium benzoate, 4-chloro-3-nitrobenzene sodium sulfonate, 4-bromonitrobenzene, 4-fluoronitrobenzene, 4-chloronitronaphthalene, etc.

Other compounds which may be reduced according to the present novel process are: 4-chloro-2,6-dinitrobenzene and isomers, 2-nitro-7-chloroanthraquinone and isomers, 4-bromo-3-nitrobenzene sodium sulfonate, 2-chloro-4-nitro-benzyl alcohol and isomers, 4-chloro-2,6-dinitrophenol, 5-chloro-3-nitro-o-phenylenediamine, 2-chloro-6-nitrotoluene and isomers, 2,6-dibromo-4-nitrophenol and isomers, 2,6-dichloro-4-nitroaniline and isomers, 2-chloro-4-nitrobenzylmalonic acid and its position isomers.

Representative examples illustrating the present invention are as follows:

A. CATALYST PREPARATION

Example 1

28 parts of Shawinigan Black (100% compression) and 11.5 parts of soda ash were added to 700 parts of distilled water. The mixture was stirred and heated to 95° C. After 30 minutes at this temperature a solution of 3.5 parts of chloroplatinic acid (equal to 1.4 parts of platinum) dissolved in 75 parts of water was added over a 30-minute period. The mixture was then stirred and held at 99±1° C. until the platinum was all precipitated. This required about 5 to 6 hours. The mixture was then cooled, diluted with 300 parts of water and filtered to produce 110.6 parts of catalyst paste (about 25% by weight solids). This platinum hydroxide paste contained 5% Pt (as hydroxide) on a dry carbon basis. It was admixed (e.g., blended or diluted) with an equal weight (110 parts) of dry Shawinigan Black to 1% Pt on a dry carbon prior to reduction in situ with hydrogen just prior to use.

Example 2

20 parts of sodium bicarbonate and 28 parts of Shawinigan Black were agitated with 700 parts of distilled water at room temperature. Then 0.7 part of chloroplatinic acid (equal to 0.28 part of Pt) dissolved in 20 parts of water were added in 5 to 10 minutes, after which the mixture was heated to 95° C. in 25 minutes. After one hour at 94±1° C., 10 parts of 16.5% formaldehyde solution were added in 5 minutes. After 30 minutes near the boil, the reaction mixture was cooled and filtered to obtain 107 parts of catalyst paste which contained 1% platinum (reduced) on a dry carbon basis.

Example 3

50 parts of Darco G-60 was added to 700 parts of distilled water and the mixture was agitated and boiled under reflux for 30 minutes. The slurry was cooled to room temperature and 40 parts of sodium bicarbonate were added. Then, 0.84 part of palladium chloride (0.5 part of palladium) was dissolved in 40 parts of 1.7% hydrochloric acid at 95° C. This solution was added to the alkaline Darco Slurry over a 25-minute period prior to heating to 95±2° C. in 40 minutes and holding at this temperature for 30 minutes.

Reduction to catalytic palladium was effected by adding 20 parts of 16.5% formaldehyde and boiling for 30 minutes as described in Example 2. The mixture was then cooled and filtered to collect the catalyst paste. The paste (124 parts by weight) was washed with 200 parts of water and 124 parts of catalyst paste containing 1% Pd on a dry carbon basis was thus obtained.

Example 4

A catalyst was prepared by the procedure described in Example 2 except that Dargo G-60 was used instead of Shawinigan Black, and this porous carbon was preboiled with water to remove occluded air and dissolved gases.

Example 5

This catalyst was prepared by the procedure outlined in Example 1 using Darco instead of Shawinigan Black.

Example 6

The procedure of Example X of U.S. 2,823,235 was followed to obtain a catalyst of 4.5% palladium, 0.54% platinum and 5% iron (as Fe$^{+++}$ hydroxide) on Shawinigan Black.

B. REDUCTION PROCESSES

Example 7

A nickel-clad (1 gal.) autoclave jacketed for heating, or cooling with circulating water and equipped with baffles, and efficient agitation was charged with:

2000 parts of 3,4-dichloronitrobenzene
100 parts of water
3.2 parts of the catalyst paste of Example 1 (equal to 0.04 part of Pt as hydroxide and 0.8 part of Shawinigan Black)
3.2 parts of Shawinigan Black, and
2.5 parts of calcined magnesite (MgO). (The weight ratio of nitrobody to platinum catalyst is 50,000:1 and the amount of MgO is 0.125% of the nitrobody.)

Air in the autoclave and lines was displaced by pressurizing with nitrogen and releasing the pressure through the vent system. The autoclave was then pressured to 500 p.s.i.g. and allowed to stand without agitation for 20 minutes to assure a gas tight system. After the pressure test, the pressure was released and nitrogen was displaced with hydrogen by successive pressurizing to 100 p.s.i.g. and venting to zero p.s.i.g. The temperature of the mixture was then adjusted to 40–50° and the agitator started. The hydrogen pressure was then increased to 500 p.s.i.g. The charge absorbed hydrogen rapidly with the evolution of heat. The autoclave was repressured with hydrogen after each 100-lb. drop in pressure. After the initial reaction at 50° to 60° C., the temperature was held at 90° to 95°, with water circulating in the autoclave jacket at 70° to 95° C. so as to maintain a rapid rate of reduction. When no further hydrogen absorption was noted, the mass was held 1 to 2 hours longer at 95° and 500 p.s.i.g. pressure to assure complete reduction. The total time required for the hydrogenation was three to five hours.

The hot reduction mass was then blown with nitrogen directly from the autoclave into a line pressure filter precoated with Celite diatomaceous earth. The jacketed filter and lines were preheated with steam to avoid crystallization of the dichloroaniline. The autoclave, lines and spent catalyst were then washed with 500 parts of hot water. The filtration at 50 to 75 p.s.i.g. pressure was completed in 30 to 45 minutes. The hot clarified reduction mass was allowed to settle at 80° to 85°, and the layers were separated. The water layer (760 parts) had a pH of 8.7 and analyzed 0.16% ionic chlorine. Based on chloride ion in the water layer the mole percent of dechlorination was 0.33.

The wet dichloroaniline layer (1665 parts) contained 0.55% water, and 0.02% nitrobody by TiCl$_3$ titration analysis.

Water was removed by applying vacuum at 20 to 30 mm. of H$_8$ at 105° to 110° C.

The yield of residual dichloroaniline was 97% of theory. The product analyzed as follows:

| | F.P., °C. | Percent Purity (M.W. 162) by nitrite absorption | Percent NO$_2$ (by TiCl$_3$) | Percent Chlorine | |
|---|---|---|---|---|---|
| | | | | Total | Ionic |
| Found | 70.5 | 100 | 0.02 | 43.3 | 0.002 |
| Calculated | 71.7 | 100 | Nil | 43.85 | Nil |

Following the same general procedure, but using the catalyst of Example 2 (formaldehyde reduced catalyst), 3,4-dichloroaniline was obtained with less than 1 mole percent dechlorination.

Example 8

The reduction autoclave was charged with 630 parts of 95% isopropyl alcohol, 1300 parts of 3,4-dichloronitrobenzene, 10 parts of the platinum catalyst of Example 4, and 2 parts of magnesium oxide slurried in 50 ml. of water. The ratio of nitrobody:catalyst is 43,333:1 and the MgO taken is 0.153% of the nitrobody used.

Hydrogen reduction was effected at 150 to 500 p.s.i.g. pressure at a temperature range from 25° to 100° C. as described in Example 7. The hot reduction mass (1936 parts) from the autoclave was diluted with 500 parts (by volume) of isopropyl alcohol and heated to 65° C. The hot mixture was then filtered through a heated bed of 25 parts of Celite diatomaceous earth. The insoluble spent catalyst was washed on the filter with three 100 parts (by volume) portions of hot isopropyl alcohol. Alcohol was then recovered from the combined filtrates (2500 parts) by distillation at atmospheric pressure to a pot temperature of 101° C. Isopropyl alcohol and water distilled over at 80° to 82° C. The residual dichloroaniline (1172 parts) was agitated at 95° for 15 to 20 minutes with 500 parts of water and then allowed to settle for 15 minutes. Separation of the layers yielded 440 parts of water (pH 6.7, percent ionic chlorine=0.20), and 1150.5 parts of wet dichloroaniline (lower layer). This oil was dehydrated by vacuum distillation as described in Example 7. The yield of dichloroaniline (F.P. 70.7° C., 100% purity by nitrite absorption, M.W. 162) was 1030.5 parts, or 97.5% of theory. The mole percent dechlorination was 0.43% based on total chloride ion found in the spent catalyst, water wash solution, and the dichloroaniline.

Example 9

A mixture of 400 parts of 4-chloro-2-nitrotoluene (freezing point 36.3° C., 25 parts of water, 0.8 part of the platinum hydroxide catalyst of Example 1, 0.8 part of Shawinigan Black, and 0.5 part of magnesium oxide was reacted with hydrogen at 85° to 90° at 500 p.s.i.g. pressure as previously described. The ratio of nitrobody to catalyst was 40,000:1 and the amount of MgO used was 0.125% of the nitrobody taken. The reduction time was 0.75 hr. per mole of nitrobody and the mole percent dechlorination was 1.5. A 96% yield of distilled 4-chloro-2-aminotoluene, boiling at 108°/3 mm. of Hg; freezing point 21.5° C.; percent Cl found/calc. 24.9/25.1; percent purity M.W. 141.5 (by nitrite absorption):100%;) was obtained.

Example 10

Using the catalyst of Example 5 at a nitrobody:catalyst ratio of 20,000:1, an amount of MgO equal to 0.25% of the nitrobody taken, and following the procedure of Example 9, 2-chloro-4-nitrotoluene was reduced to 2-chloro-4-aminotoluene in 94.5% yield and at a purity of product of 99.9%.

Example 11

A mixture of 300 parts 2,5-dichloronitrobenzene (freezing point 53.3° C.) was reduced with 2.7 parts of platinum hydroxide on Darco G–60 paste (catalyst of Example 5) and 1 part of magnesium oxide as described in the preceding examples. This corresponded to a ratio of nitrobody to catalyst of 37,500:1 and the MgO taken was 0.3% of the nitrobody. After washing with water, separation from catalyst, and dehydration by heating to 70° at 2 mm. of Hg pressure there was obtained 245.5 parts of technical 2,5-dichloroaniline, M.P. 48.5–49.5° C. Dechlorination occurred to the extent of 2.8 mole percent. The product analyzed:

Percent NO$_2$: 0.01
Percent purity (M.W. 162): 99.9
Percent chlorine, found/calc.: 42.6/43.7

Example 12

Ortho and paranitrochlorobenzenes were also reduced without excessive dechlorinataion in the absence of solvent with platinum hydroxide on Darco G–60 (catalyst of Example 5) using 1 part platinum for 45,000 parts of nitrocompound and 0.25% magnesium oxide (based on nitrobody). Results are shown in Table I.

TABLE I

*Ortho and Para Chloroanilines*

| Nitro-Chloro-benzene Compound | Red. Time, hr./mole | Mole Percent Dechlorination | Percent Yield | Percent Purity | Product Quality | | |
|---|---|---|---|---|---|---|---|
| | | | | | Percent Cl (Found/Calc.) | Percent $NO_2$ | °C., F.P. |
| ortho | 1.33 | 2.2 | 94.0 | 100 | 27.8/27.8 | Nil | −3 |
| para | 1.97 | 1.8 | 97.0 | 100 | 27.0/27.8 | 0.01 | 69.6 |

Example 13

A solution of 101 parts of 1-bromo-4-nitrobenzene (M.P. 126–127.5°) dissolved in 238 parts of methyl alcohol was reduced at 29° to 60° C. with 500 p.s.i.g. hydrogen pressure in the presence of 1.5 parts of a paste of platinum (0.0045 part Pt) on Darco G-60 (catalyst of Example 4) and 0.3 part of magnesium oxide. Reduction was complete in 20 to 30 minutes. The reduction mass was filtered from catalyst and the alcohol recovered by distillation. The residual oil (65 parts) was then extracted with 150 parts of water at 70° C. The pH of the water (144 parts) extract was 7.6. It contained 0.43% of ionic bromine. This was equivalent to 2.2 mole percent debromination (based on nitrobromobenzene). The water extracted oil layer (87.0 parts) solidified on cooling. The crude unrefined product analyzed as follows:

M.P. 59.5° to 63.5° C. (Lit. 63, 66.4° C.)
Percent purity (M.W. 172): 97.7 (by nitrite absorption)
Percent water: 0.3
Percent Br, found/calc.: 45.8/46.5

Example 14

A solution of 50 parts 1-fluoro-4-nitrobenzene (0.350 mole) in 238 parts of methyl alcohol was reduced with 0.003 part of platinum on Darco G-60 (catalyst of Example 4) and 0.3 part of magnesium oxide at 30° to 50° as described in Example 13. Less than 0.1 mole percent defluorination occurred. 35 parts of p-fluoroaniline (0.315 mole) B.P. 64–66° C./5 mm. The product analyzed:

Percent F, found/calc.: 16.5/17.1
Percent $NO_2$: 0.01
Percent purity (by nitrite absorp.): 98.9

Example 15

A dispersion of 130 parts of technical 2-chloro-4-nitroaniline (M.P. 106° to 108° C.) in 238 parts of methyl alcohol was hydrogenated at 500 p.s.i.g. pressure at 60° to 90° C. in the presence of 0.009 part of platinum on Darco G-60 (catalyst of Example 4), and 0.3 part of magnesium oxide. Reduction was complete in 2½ to 3 hours. The catalyst was removed by filtration and evaporation of the alcoholic solvent and dehydration at 100°/1 mm. of Hg pressure yielded 108 parts of o-chloro-p-phenylenediamine product (Beilstein Vol. XIII, p. 117) as residual oil which melted at 58.5° to 61° C. (Lit. 63 to 64° C.). The product analyzed:

Percent org. Cl, found/calc.: 24.7/24.9
Percent inorg. Cl: 0.61
Percent Dumas N, found/calc.: 19.3/19.65

Based on the inorganic chlorides found, the extent of dechlorination was 2.5 mole percent.

Example 16

A solution of 141 parts of technical 4-chloro-2-nitroanisole (M.P. 97° to 99° C.) in 238 parts of methyl alcohol was hydrogenated in 15 minutes at 40° to 73° C. at 500 p.s.i.g. pressure in the presence of 1 part platinum per 31,400 parts of nitrobody, 0.45 part of Darco G-60 and 0.3 part of magnesium oxide.

Technical 4-chloro-2-aminoanisole (Beilstein Vol. XIII, p. 383), was isolated as described in Example 13 and 117.5 parts of crude product (M.P. 81.8° to 83° C.; Lit. 82° to 83° C.) was obtained which analyzed 99.6% purity (M.W. 157.5) by nitrite absorption, and 0.13% water.

The pH of the reduction mass was 7.9, and the extent of dehalogenation was 0.25 mole percent.

Example 17

A dispersion of 151 parts technical 2-chloro-4-nitrobenzoic acid (M.P. 141° to 142° C.) suspended in 238 parts of methyl alcohol was hydrogenated in the presence of platinum catalyst (nitrobody to platinum ratio=30,000:1) and magnesium oxide (0.2% of nitrobody) as described in the previous examples. The 2-chloro-4-aminobenzoic acid (Beilstein Vol. XIV, p. 438) which crystallized from the alcoholic solvent analyzed as follows:

Percent org. Cl, found/calc.: 20.3/20.7
Percent inorg. Cl: 0.1
Percent purity (M.W. 171.5) 97.7 (by nitrite absorption)
M.W. (by NaOH titre) found/calc.: 176.7/171.5

Example 18

A solution of 112 parts of sodium 6-chloro-2-nitrobenzoate in 500 parts of water was hydrogenated at 120° C. and 600 p.s.i.g. pressure in the presence of 0.009 part platinum on Darco G-60 and 0.3 part magnesium oxide. The extent of dechlorination was 1.8 mole percent, by chloride ion analyses. Acidification of the clarified reduction liquors with dilute hydrochloric acid to a pH of 3.5 to 4.0 gave a precipitate of 6-chloro-2-aminobenzoic acid. The dry product analyzed as follows:

M.P. ° C.: 140.5–141° (dec.) Lit. (146°–147°)
Percent Cl, found/calc.: 20.3/20.7
Percent dechlorination: 1.8%
Percent $NO_2$: 0.05
Percent purity, M.W. 171.5: 97.9 (by nitrite absorption)
M.W. (by NaOH titre) found/calc.: 172.6/171.5

Example 19

A mixture of 104 parts of 4-chloro-3-nitrobenzene sodium sulfonate (0.40 mole) 400 parts water, 0.012 part platinum on 1.2 part Darco G-60, 0.5 part of magnesium oxide, was reacted with hydrogen at 500 p.s.i.g. pressure at 36° to 100° C. The reduction liquors obtained after filtration from catalyst had a pH of 7.8 and contained 0.385 mole of 4-chloro-3-aminobenzene sodium sulfonate by amine titre which is equivalent to 96% yield. The chloride ion content was 4 mole percent dechlorination.

The product (Beilstein Vol. XIV, p. 691) obtained from the liquors by precipitation with concentrated hydrochloric acid analyzed as follows:

Percent Cl, found/calc.: 15.5/15.5
Percent Dumas N, found/calc.: 6.0/6.1
Percent purity (by nitrite) M.W. 229.5=100

Example 20

The equipment which was used for reduction at atmospheric presure is described in Example 7 of U.S. 2,765,342 and consists of a 5-liter round-bottomed flask which had four vertical creases serving as baffles. The flask was fitted with a sealed-in glass stirrer which consisted of a 5.5-inch flat blade 1.5 inches high with a circular lower edge. This agitator was revolved with an air motor at 550 to 600 r.p.m. The flask was also provided with a manometer for reading pressure, a heating bath, and inlet and outlines for hydrogen gas.

The flask was swept with nitrogen (1 to 1.5 cu. ft./hr.)

to displace air. The following were then added while stirring at 200 to 250 r.p.m.:

500 parts (by volume) of methyl alcohol
148 parts of 3,4-dichloronitrobenzene
7.5 parts of platinum on Darco G–60 paste (prepared as described in Example 4) equivalent to 0.0225 part of platinum and 2.25 parts of dry carbon and
0.25 part of magnesium oxide.

The stirred mixture was heated to 55° C. while sweeping with hydrogen (1.0 to 1.5 cu. ft./hr.) to displace nitrogen and increasing the speed of agitation to 550 to 600 r.p.m. Hydrogen was added over the surface of the agitated mixture, and the flow was regulated (manually) so that no great excess of gas bubbled through at a water seal. The reduction was complete when no further significant absorption of hydrogen was noted. The rate of reduction is illustrated in the following table:

REDUCTION RATE AT 50°, 760 MM OF HG

| Elapsed Time, Minutes | H₂ Flow On., cu. ft./hr. | Total H₂ Absorbed,¹ Cu.Ft. |
|---|---|---|
| 5 | 0.82 | 0.052 |
| 15 | 0.85 | 0.177 |
| 45 | 0.68 | 0.540 |
| 105 | 0.70 | 1.228 |
| 160 | 0.65 | 1.815 |
| 205 | 0.15 | 1.973 |
| 240 | 0.15 | 1.973 |

¹ By difference from readings of inlet and outlet meters.

Hydrogen in the system was displaced by nitrogen when the reduction was completed, and the charge was filtered at 60° C. to recover catalyst. The catalyst was washed with 100 parts (by volume) of hot methyl alcohol to assure complete removal of amine. The product 3,4-dichloroaniline (M.P. 72–73° C., containing 0.01% $NO_2$ and analyzing 100% purity of (M.W. 162) by nitrite absorption), was isolated in 96 to 97% yields by evaporation of solvent, water washing and dehydrating as described in the preceding examples. The extent of dehalogenation as determined by analysis for water soluble chloride ion formed was 0.87 mole percent. The pH of a water slurry of the reduction mass was 7.3.

*Example 21*

A mixture of 792 parts of methyl alcohol, 1100 parts of 3,4-dichloronitrobenzene, 7.5 parts of platinum on Darco G–60 paste (prepared as described in Example 4) was slurried in 10 parts of water and 11 parts of magnesium oxide (1% of nitrobody) were charged into the autoclave and hydrogenated progressively at pressures from 100 to 500 p.s.i.g. pressure as illustrated in the previous examples. The product was isolated as described in Example 8 in equivalent yield. Results as follows were obtained:

Mole percent dechlorination: 0.5
pH of reduction mass: 7.1
Analysis of Product (dry):
  M.P. ° C. 72–73
  Percent Purity (M.W. 162): 99.6
  Percent $NO_2$: 0.01

When the above reduction was carried out without the magnesium oxide present, 1.2 mole percent of dechlorination resulted. Thus, use of the MgO reduced dechlorination by over 50%.

When the same process was carried out with calcium carbonate instead of magnesium oxide 1.2 mole percent of dechlorination occurred.

*Example 22*

When 3,4-dichloronitrobenzene was reduced under atmospheric conditions in methanol as in Example 20, magnesium oxide was also specific in its effect on reducing dechlorination. In the absence of MgO, 1.83 mole percent of dechlorination occurred. With 0.17% of MgO, 0.87% dechlorination occurred and with 0.17% Mg(OH)₂ 1.00% of dechlorination was observed.

Oxides and hydroxides of nickel, barium, calcium and chromium were ineffective in reducing dechlorination.

*Example 23*

When Example 11 was repeated with the palladium catalyst of Example 3 dechlorination of 80 mole percent occurred.

*Example 24*

When Example 11 was repeated with a ratio of nitrobody to platinum of 5000:1, 39 mole percent of dechlorination occurred.

*Example 25*

When the catalyst of Example 6 was used to reduce 3,4-dichloronitrobenzene in a methanol system in accord with the process of Example 20, 42 mole percent of dechlorination occurred.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for minimizing the formation of dehalogenated products during the catalytic hydrogenation of halogen-substituted aromatic nitro compounds selected from the group consisting of halogen-substituted nitro benzenes and halogen-substituted nitro naphthalenes to halogen-substituted aromatic amines, which process comprises effecting the reduction of said halogen-substituted aromatic nitro compound in the presence of (a) platinum supported on carbon as the sole catalyst and (b) a dehalogenation-suppressor selected from the group consisting of magnesium oxide and magnesium hydroxide, said reduction being carried out with agitation at a temperature within the range of 30° to 120° C., the weight ratio of said nitro compound to said platinum being greater than 10,000:1 and not more than 150,000:1, and said magnesium dehalogenation-suppressor being present in an amount between 0.1 to 1% by weight of said nitro compound.

2. A process for minimizing the formation of dehalogenated products during the catalytic hydrogenation of an aromatic chlorine-substituted nitro compound selected from the group consisting of chlorine-substituted nitro benzenes and chlorine-substituted nitro naphthalenes to the corresponding amine, which process comprises effecting the reduction of said chlorine-substituted aromatic nitro compound in the presence of (a) platinum supported on carbon as the sole catalyst and (b) a dehalogenation-suppressor selected from the group consisting of magnesium oxide and magnesium hydroxide, said reduction being carried out with agitation at a temperature within the range of 30° to 120° C., the weight ratio of said nitro compound to said platinum being greater than 10,000:1 and not more than 150,000:1, and said magnesium dehalogenation-suppressor being present in an amount between 0.1 to 1% by weight of said nitro compound.

3. A process for minimizing the formation of dehalogenated products during the catalytic hydrogenation of a chlorine-substituted nitrobenzene to the corresponding amine, which process comprises effecting the reduction of said aromatic chlorine-substituted nitrobenzene in the presence of (a) platinum supported on carbon as the sole catalyst and (b) a dehalogenation-suppressor selected from the group consisting of magnesium oxide and magnesium hydroxide, said reduction being carried out with agitation at a temperature within the range of 30° to 120° C., the weight ratio of said nitro compound to said platinum being greater than 10,000:1 and not more than 150,000:1, and said magnesium dehalogenation-suppressor being present in an amount between 0.1 to 1% by weight of said nitro compound.

4. The process of claim 3 wherein the chlorine-substituted nitro compound reduced is 3,4-dichloronitrobenzene.

5. The process of claim 3 wherein the chlorine-substituted nitro compound reduced is para-nitrochlorobenzene.

6. The process of claim 3 wherein the chlorine-substituted nitro compound reduced is 4-chloro-3-nitrobenzene.

7. The process of claim 3 wherein the chlorine-substituted nitro compound reduced is 2,5-dichloronitrobenzene.

8. A process for minimizing the formation of dehalogenated products during the catalytic hydrogenation of a nuclear chlorine-substituted nitrotoluene to the corresponding amine, which process comprises effecting the reduction of said chlorine-substituted aromatic nitro compound in the presence of (a) platinum supported on carbon as the sole catalyst and (b) a dehalogenation-suppressor selected from the group consisting of magnseium oxide and magnesium hydroxide, said reduction being carried out with agitation at a temperature within the range of 30° to 120° C., the weight ratio of said nitro compound to said platinum being greater than 10,000:1 and not more than 150,000:1, and said magnesium dehalogenation-suppressor being present in an amount between 0.1 to 1% by weight of said nitro compound.

9. The process of claim 8 wherein the chlorine-substituted nitro compound reduced is 4-chloro-2-nitrotoluene.

References Cited in the file of this patent

UNITED STATES PATENTS

| 2,823,235 | Graham et al. | Feb. 11, 1958 |
| 2,867,628 | Cass | Jan. 6, 1959 |
| 2,876,263 | Mark | Mar. 3, 1959 |